United States Patent
Brandts et al.

(10) Patent No.: US 7,606,000 B1
(45) Date of Patent: Oct. 20, 2009

(54) OFFSET STRUCTURE FOR DISK DRIVE HEAD SUSPENSION

(75) Inventors: Jackson W. Brandts, Watertown, MN (US); Corey P. Theis, Gibbon, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 502 days.

(21) Appl. No.: 11/370,572

(22) Filed: Mar. 8, 2006

Related U.S. Application Data

(60) Provisional application No. 60/677,037, filed on May 3, 2005.

(51) Int. Cl.
G11B 21/21 (2006.01)
(52) U.S. Cl. .................. 360/244.8; 360/244.3
(58) Field of Classification Search .............. 360/244.3, 360/244.8
See application file for complete search history.

(56) References Cited

U.S. PATENT DOCUMENTS

| | | | |
|---|---|---|---|
| 4,760,478 A * | 7/1988 | Pal et al. .................. 360/244.3 |
| 4,996,623 A * | 2/1991 | Erpelding et al. ........ 360/244.3 |
| 5,187,625 A | 2/1993 | Blaeser et al. |
| 5,461,525 A | 10/1995 | Christianson et al. |
| 5,594,607 A * | 1/1997 | Erpelding et al. ........ 360/244.3 |
| 5,955,176 A * | 9/1999 | Erpelding et al. ........... 428/209 |
| 5,999,369 A | 12/1999 | Shimizu et al. |
| 6,088,192 A | 7/2000 | Riener et al. |
| 6,462,910 B1 * | 10/2002 | Shimizu et al. .......... 360/244.8 |
| 6,700,745 B2 | 3/2004 | Shiraishi |
| 6,738,229 B2 | 5/2004 | Williams |
| 6,898,841 B2 * | 5/2005 | Shiraishi .................. 29/603.04 |
| 6,920,018 B2 | 7/2005 | Oh et al. |
| 7,114,238 B2 * | 10/2006 | Shiraishi .................. 29/603.03 |
| 7,209,325 B2 * | 4/2007 | Boutaghou et al. ....... 360/244.2 |
| 7,301,729 B2 * | 11/2007 | Wada et al. .............. 360/244.3 |
| 7,408,743 B1 * | 8/2008 | McCaslin et al. ........ 360/244.8 |
| 2002/0181155 A1 | 12/2002 | Takagi et al. |
| 2004/0228037 A1 * | 11/2004 | Wada et al. .............. 360/244.3 |
| 2005/0007702 A1 | 1/2005 | Oh et al. |
| 2007/0115590 A1 * | 5/2007 | Resh et al. ............... 360/244.3 |

FOREIGN PATENT DOCUMENTS

| JP | 02235273 A | * | 9/1990 |
| JP | 11185415 A | * | 7/1999 |
| JP | 2003059223 A | * | 2/2003 |

* cited by examiner

Primary Examiner—William J Klimowicz
(74) Attorney, Agent, or Firm—Faegre & Benson LLP

(57) ABSTRACT

A TMR-compensating suspension, or one or more suspension components such as a hinge or beam that can be assembled with other components to make a suspension. The suspension includes a proximal actuator mounting region, a rigid beam region, and a spring region or spring legs between the actuator mounting and beam regions. The load beam or component is formed from a multi-layer laminate and is configured with an offset structure at the spring region or spring legs that skews or twists the beam region with respect to the actuator mounting region. Motion of the beam region with respect to the actuator mounting region when the load beam is used in a disk drive will therefore include a TMR-compensating radial component.

2 Claims, 13 Drawing Sheets

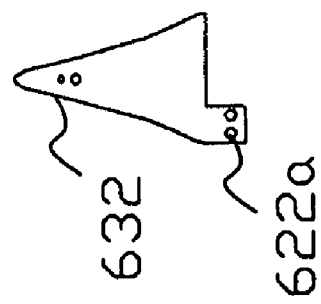
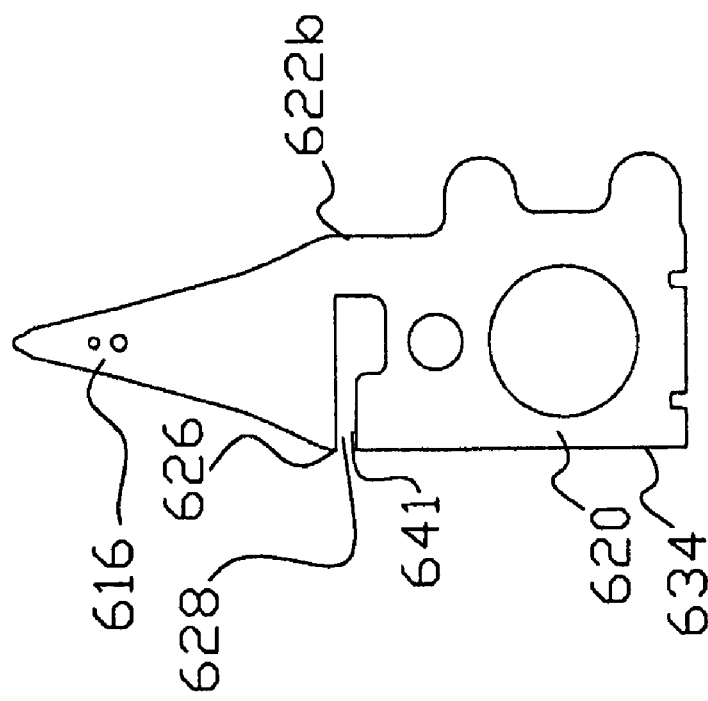
FIGURE 8B
FIGURE 8A

OFFSET STRUCTURE FOR DISK DRIVE HEAD SUSPENSION

RELATED APPLICATIONS

The present application claims the benefit of U.S. Patent Application Ser. No. 60/677,037 entitled Offset Laminate Load Beam Structures for Disk Drive Head Suspension TMR Compensation, filed May 3, 2005, the entire disclosure of which is hereby incorporated by reference.

TECHNICAL FIELD

The present invention relates to disk drive head suspensions used with dynamic data storage. More specifically, the invention relates to methods and apparatuses for reducing mis-registration between a head suspension and a disk drive.

BACKGROUND

The rotating disks in conventional disk drives are prone to vibration or flutter. This flutter causes the information tracks on the disk to move in a radial direction. If the suspension or load beam supporting the slider or data access head is not able to accurately follow this radial movement, detrimental track mis-registration ("TMR") can occur.

Suspensions and related structures capable of compensating for TMR are generally known and disclosed. See, for example, the Shimizu et al. U.S. Pat. No. 5,999,369, the Reiner et al. U.S. Pat. No. 6,088,192, the Williams U.S. Pat. No. 6,738,229 and the Oh et al. U.S. Patent Publication No. 2005/0007702.

Some known designs utilize extra components (e.g., shims) to be added (e.g., welded) to the suspensions. Designs of this nature require an additional piece of material that is added in the assembly process and placed precisely along with other components of the suspension which can create issues with component location and clamping schemes that are available to use as the parts get smaller and smaller. Also, incorporating another component into the suspension requires the associated process features to be incorporated (such as carrier strips, struts, and de-tabbing features), inviting additional processing steps to the manufacture of the product. These features also increase the amount of scrap in the manufacturing process. Other designs achieve this offset by offsetting the entire suspensions during the swaging process or by building the offset into the baseplate/mount. Both of these options can be difficult from a head suspension assembly standpoint and may not be proven effective and/or efficient in high volume applications. Furthermore, the capabilities of such processes are unproven from a part performance standpoint.

As is evident from these references, a suspension having radial head motion capability will experience less TMR There remains, however, a continuing need for improved suspensions and suspension components capable of compensating for TMR.

SUMMARY

In one embodiment, the present invention is a load beam comprising a multi-layer laminate having a spring region. The spring region includes a TMR-compensating offset structure.

In another embodiment, the present invention is a hinge component for use with a load beam. The hinge component is formed from a multi-layer laminate and has a spring region including a TMR-compensating offset structure.

In yet another embodiment, the present invention is a method of compensating for TMR in a suspension with at least one component made of a multi-layer laminate. The method includes forming an offset structure at a spring region or spring legs of the suspension.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 8A is a schematic top view of the second spring metal layer of a portion of a suspension in accordance with another embodiment of the invention.

FIG. 8B is a schematic top view of the first spring metal layer of the portion of the suspension of FIG. 8A.

Figure 1:
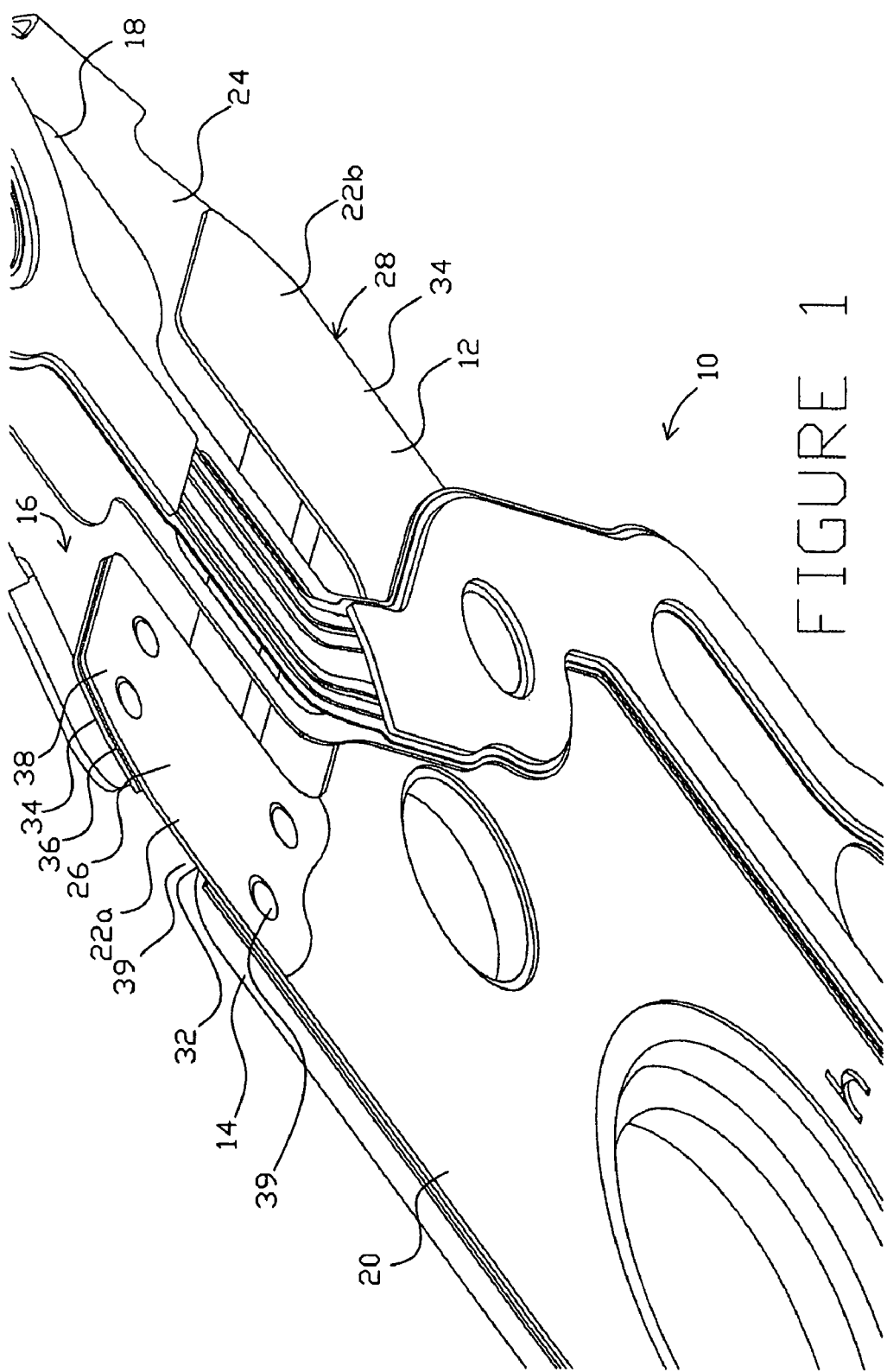
FIG. 1 is an isometric illustration of a portion of a suspension including a hinge in accordance with one embodiment of the invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is an isometric illustration of a portion of suspension 10 including a hinge 12 in accordance with one embodiment of the invention. In addition to the hinge 12, the suspension 10 includes a base plate 14, a load beam 16 and an integrated lead or wireless flexure 18. The hinge 12 includes a proximal end or actuator mounting region 20 configured for attachment to a primary actuator (not shown), and a pair of spring legs 22a, 22b that function as a spring region 28 of the suspension 10. The base plate 14 is mounted to the actuator mounting region 20 of the hinge 12. A proximal end 24 of the load beam 16 is mounted to a beam mounting region 26 on the spring legs 22a, 22b (i.e., opposite the spring region 28 of the hinge 12 from the actuator mounting region 20). Welds or other conventional or otherwise known attachment processes can be used to fasten the load beam 16 to the beam mounting region 26 of the hinge 12. A head slider (not shown) can be mounted to a gimbal (not shown) on a distal end of the flexure 18.

The load beam 16 and hinge 12 are formed from a multi-layer laminate in the illustrated embodiment. The laminate includes first and second spring metal (e.g., stainless steel) layers separated by an etch stop (e.g. polyimide) layer. Laminates of this type are well known and commercially available. The spring metal layers may, for example, be available in thicknesses of 15, 18, 20, 22, 25, 30.5, 35, 40, 50.8 and 63.5 μm. Etch stop layers (including adhesive) may, for example, be available in thicknesses of 18, 29, 54 and 79 μm. Known or otherwise conventional photolithography and etching (e.g., chemical and/or plasma) processes can be used to manufacture the load beam 16 and components. In other embodiments (not shown) the load beam 16 is formed from a single layer of spring metal or other materials or structures.

As shown in FIG. 1, the hinge 12 is a separate component from the load beam 16 and includes first and second spring metal layers 32, 34 separated by an etch stop layer 36. Spring leg 22a of the hinge 12 is formed from the first spring metal layer 32 while spring leg 22b is formed from the second spring metal layer 34. Spring leg 22a also includes apertures 39 extending through the first spring metal layer 32 and etch stop layer 36 for welding the hinge 12 to the baseplate 14 (lower set of apertures) and the load beam 16 (upper set of apertures). Spring leg 22a further includes an offset island 38 formed from the etch stop layer 36 and the second spring metal layer 34. The offset island 38 is located at the beam mounting region 26 end of the spring leg 22a.

Figure 2A:
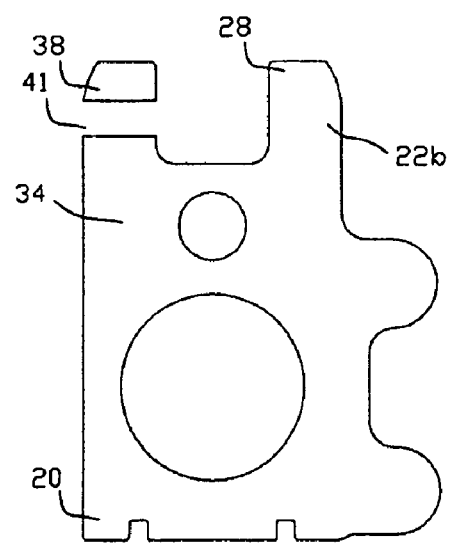
FIG. 2A is a schematic top view of the second spring metal layer of the hinge shown in FIG. 1.
Figure 2B:
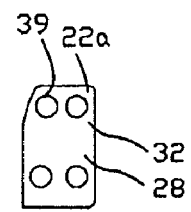
FIG. 2B is a schematic top view of the first spring metal layer of the hinge shown in FIG. 1.
Figure 2C:
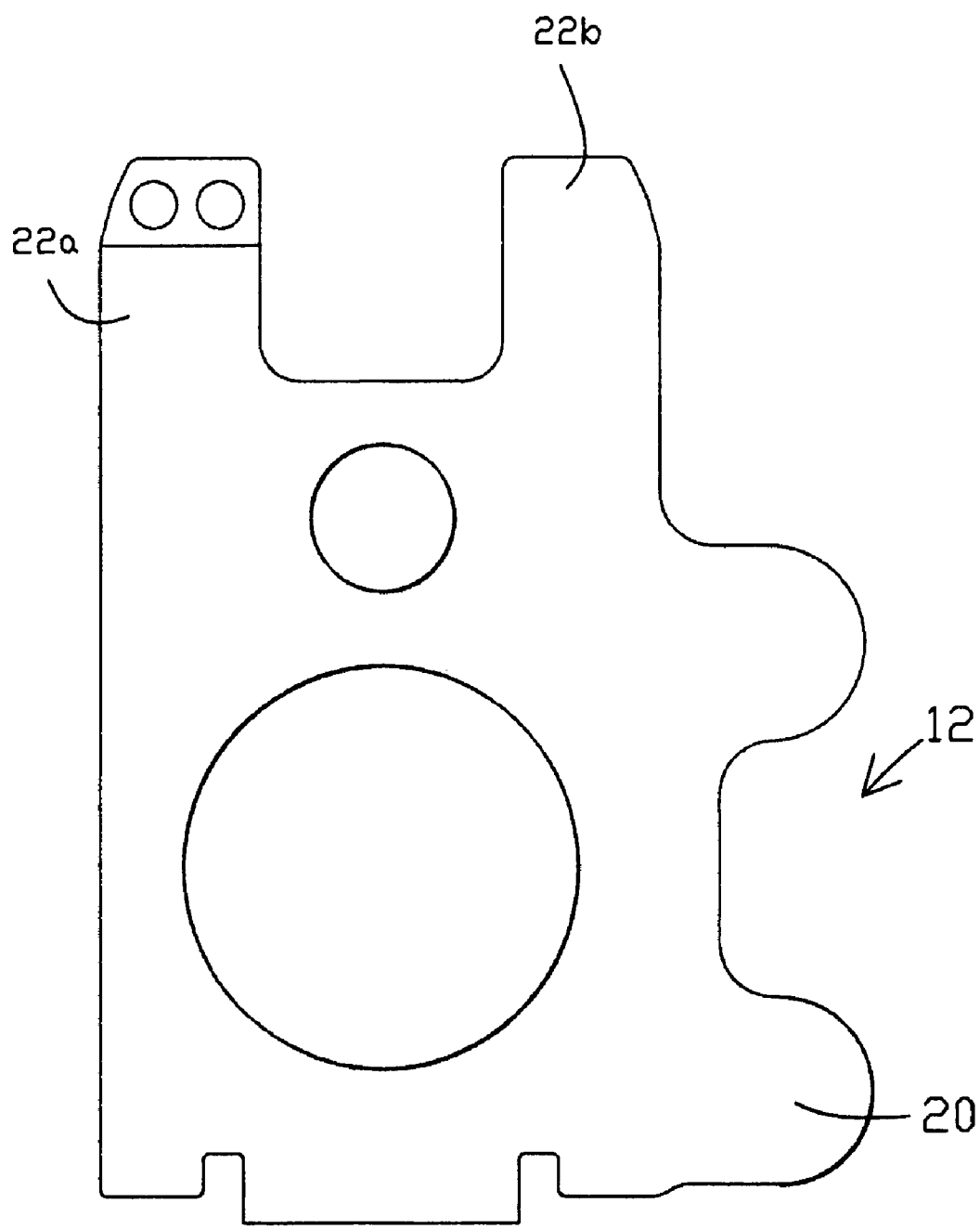
FIG. 2C is a schematic top view of the assembled hinge of FIGS. 2A and 2B.

The construction of the hinge 12 is shown more clearly in FIGS. 2A and 2B, which are schematic top views of the second and first spring metal layers 34 and 32, respectively, of the hinge 12 with the etch stop layer 36 omitted for clarity. FIG. 2C shows the assembled hinge 12. As shown, there is a gap 41 between the offset island 38 and the actuator mounting region 20. Gap 41 is provided so that both the first spring leg 22a and the second spring leg 22b are formed of a single layer of spring metal at the spring region 28. Relative flexibility of the spring region 28 on the two spring legs 22a, 22b is thus preserved. In other words, the first spring leg 22a is formed of both the first spring metal layer 32 and the second spring metal layer 34 with the etch stop layer 36 therebetween, but with the gap 41 between the beam mounting region 28 and the actuator mounting region 20.

The spring legs 22a, 22b of the hinge 12 are non-coplanar and offset (in what is known as the z-height direction) from one another in the embodiment shown in FIGS. 1-2C. In alternative embodiments (not shown), either or both of the spring region spring legs 22 can also include the etch stop layer 36.

Figure 3A:
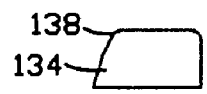
FIG. 3A is a schematic top view of the first spring metal layer of a hinge in accordance with another embodiment of the present invention.
Figure 3B:
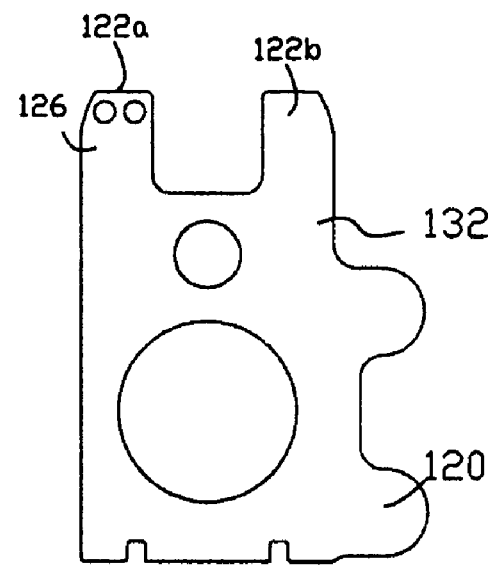
FIG. 3B is a schematic top view of the second spring metal layer of a hinge in accordance with another embodiment of the present invention.
Figure 3C:
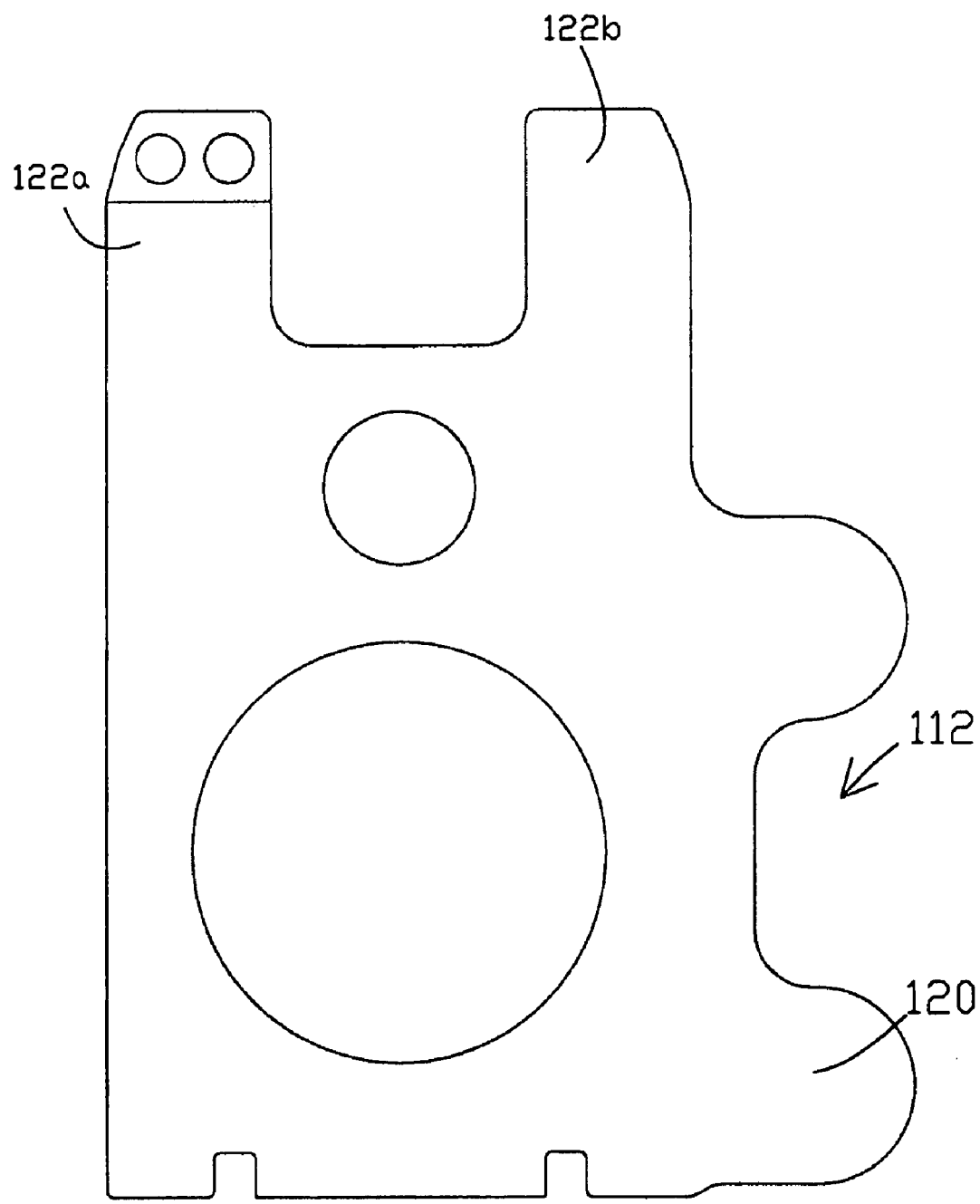
FIG. 3C is a schematic top view of the assembled hinge of FIGS. 3B and 3C.

FIGS. 3A and 3B are schematic top views of a hinge 112 in accordance with another embodiment of the invention. FIG. 3C shows the assembled hinge 112. The hinge 112 shown in FIGS. 3A-3C is similar to the hinge 12 shown in FIGS. 2A-2C in that the hinge 112 is a separate component from the load beam 116. FIG. 3A shows the second spring metal layer 134 while FIG. 3B shows the first spring metal layer 132. In this embodiment, both of the spring legs 122a, 122b are formed in the first spring metal layer 132. As shown, the first spring leg 122a further includes an offset island 138 formed in the second spring metal layer 134. The offset island 138 is attached to the beam mounting region 126 of the first spring leg 122a.

The spring legs 122a, 122b of the hinge 112 are coplanar and offset (in what is known as the z-height direction) from one another by the mounting island 138 in the embodiment shown in FIGS. 3A-3C. Although the spring legs 122a, 122b are co-planar in this embodiment of the invention, the offset provided by the offset island 138 will cause motion of the beam mounting region 126 with respect to the actuator mounting region 120 to include a TMR-compensating radial component. In alternative embodiments (not shown), either or both of the spring region spring legs 122 can also include the etch stop layer 136.

Figure 4A:
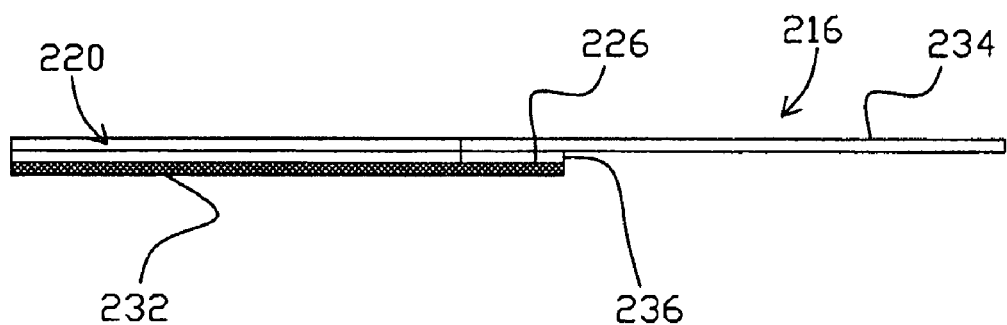
FIG. 4A is a schematic side view of a portion of a suspension in accordance with another embodiment of the invention.
Figure 4B:
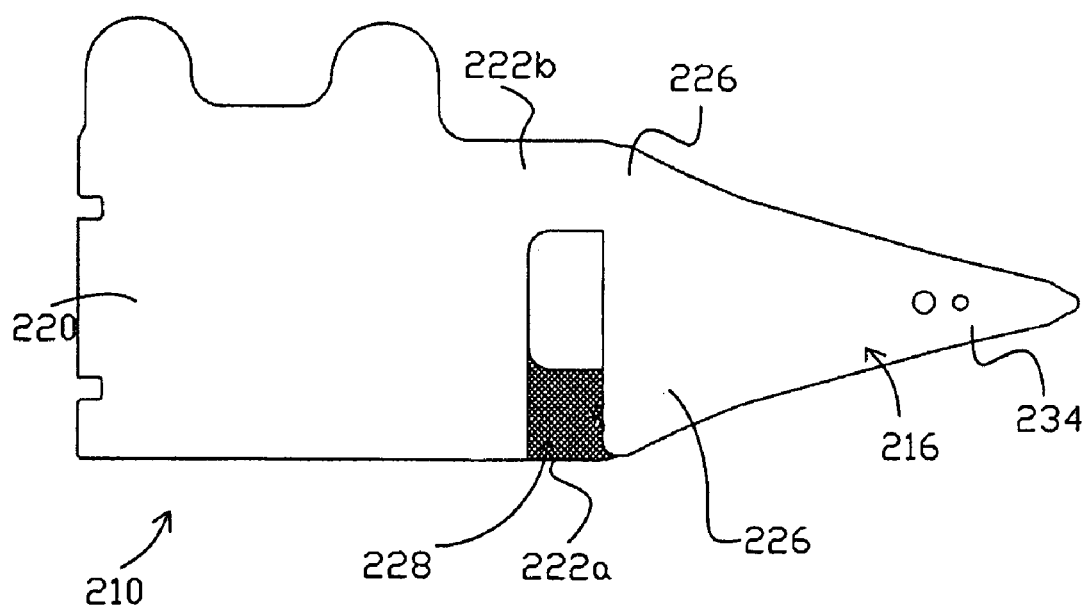
FIG. 4B is a schematic top view of the suspension of FIG. 4A.

FIGS. 4A and 4B are schematic side and top views, respectively, of a portion of a suspension 210 in accordance with another embodiment of the invention. In this embodiment, the hinge is integrally formed with the load beam 216. Thus, the load beam 216 includes an actuator mounting region 220, a spring region 228 (i.e., a hinge) and a beam region 226 manufactured from the same piece of laminate. As shown, one of the spring region spring legs 222a is formed from the first spring metal layer 232 and the second spring region spring leg 222b is formed from the second spring metal layer 234. The spring legs 222a and 222b are thereby non-coplanar and offset from one another. In the present embodiment, the beam region 226 includes only the second spring metal layer 234. In alternative embodiments (not shown), the beam region 226 is formed from only the first spring metal layer 232, the first spring metal layer 232 and the etch stop layer 236, the second spring metal layer 234 and the etch stop layer 236, or all three layers of the laminate.

Figure 5A:
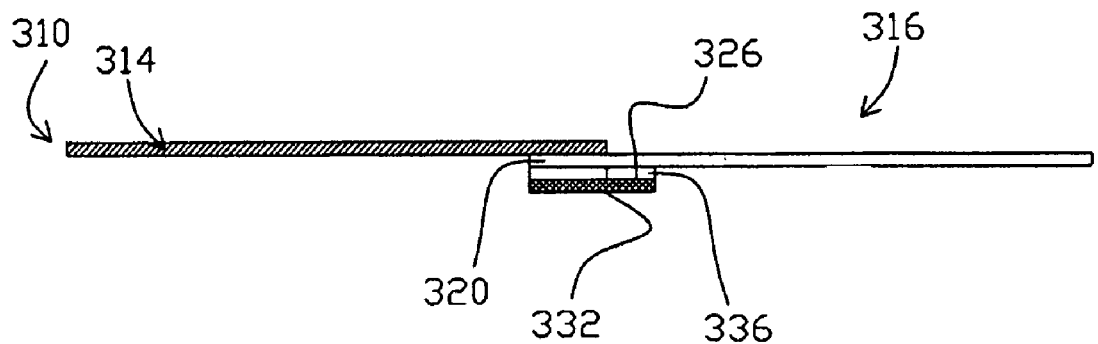
FIG. 5A is a schematic side view of a portion of a suspension in accordance with yet another embodiment of the invention.
Figure 5B:
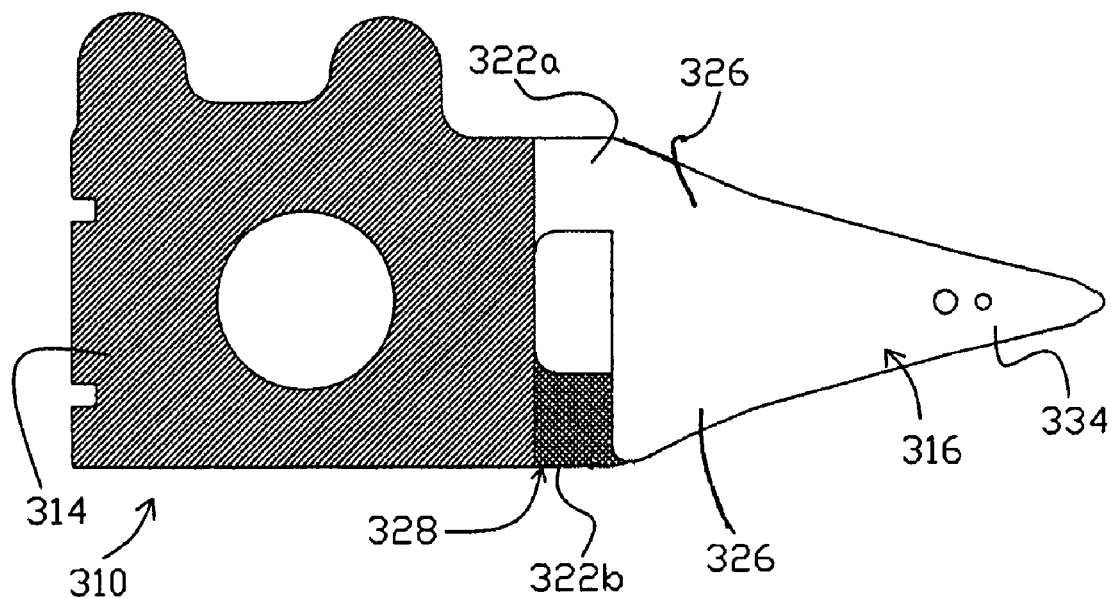
FIG. 5B is a schematic top view of the suspension of FIG. 5A.

FIGS. 5A and 5B are schematic side and top views, respectively, of a portion of a suspension 310 in accordance with yet another embodiment of the invention. With the exception of the actuator mounting region 320, the load beam 316 shown in FIGS. 5A and 5B can be similar or identical to the load beam 216 described in connection with FIGS. 4A and 4B. The actuator mounting region 320 of the load beam 316 shown in FIGS. 5A and 5B is shorter than that shown in FIGS. 4A and 4B. The suspension 310 shown in FIGS. 5A and 5B includes a base plate 314 or other actuator mounting component mounted to the actuator mounting region 320 of the load beam 316. The beam region 326 of the load beam 316 shown in FIGS. 5A and 5B is formed from only the second spring metal layer 334. In alternative embodiments (not shown), the beam regions 326 are formed from only the first spring metal layer 332, the first spring metal layer 332 and the etch stop layer 336, the second spring metal layer 334 and the etch stop layer 336, or all three layers of the laminate.

Figure 6A:
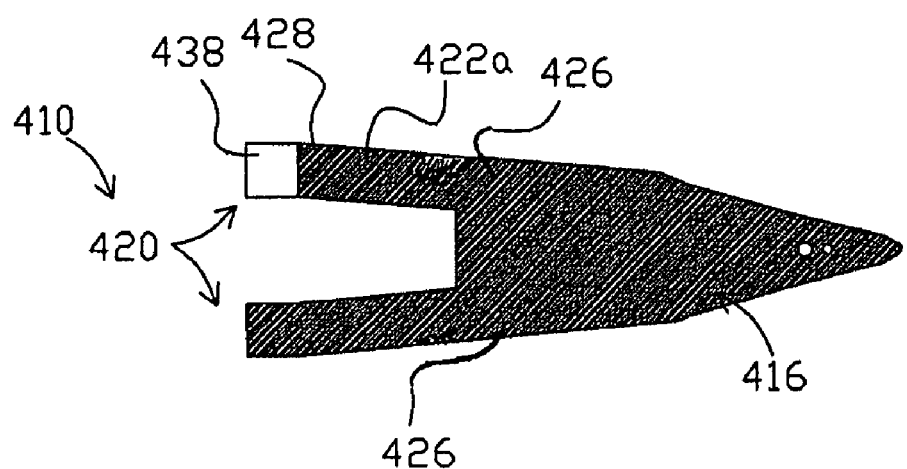
FIG. 6A is schematic side view of a portion of a suspension in accordance with another embodiment of the invention.
Figure 6B:
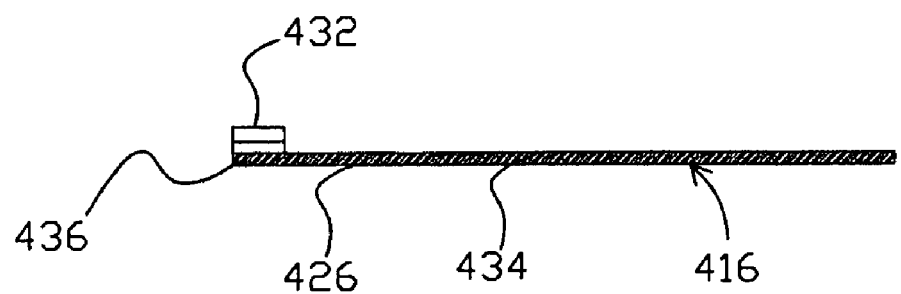
FIG. 6B is a schematic top view of the suspension of FIG. 6A.

FIGS. 6A and 6B are schematic top and side views, respectively, of a portion of a suspension 410 in accordance with another embodiment of the invention. The load beam 416 is manufactured from a multi-layer laminate of the type described above, and includes a spring region 428 and a beam region 426. Again, the hinge (i.e., spring region 428) is integrally formed with the load beam 416. In the illustrated embodiment, the beam region 426 and much of the spring region 428, with the exception of a portion of the actuator mounting region 420 on one of the spring legs 422b is formed from the second spring metal layer 434. An offset island 438 on the actuator mounting region 420 of one spring leg 422a includes the etch stop layer 436 and first spring metal layer 432. The actuator mounting region 420 of the load beam 416, including the offset island 438, can be welded or otherwise attached to a base plate or other primary actuator mounting structure (not shown).

Although the spring legs 422 of the spring region 428 are co-planar in this embodiment of the invention, the offset provided by the offset island 438 will cause motion of the beam region 426 with respect to the actuator mounting region 420 to include a TMR-compensating radial component. Yet another embodiment of the invention is similar to that shown in FIGS. 6A and 6B, but does not include the gap or cutout in the spring region 428 forming the spring legs 422a, 422b (i.e., the spring region 428 is one-piece). In alternative embodiments (not shown) the load beam region 426 also includes the etch stop layer 436, or the etch stop layer 436 and the first spring metal layer 432.

Figure 7A:
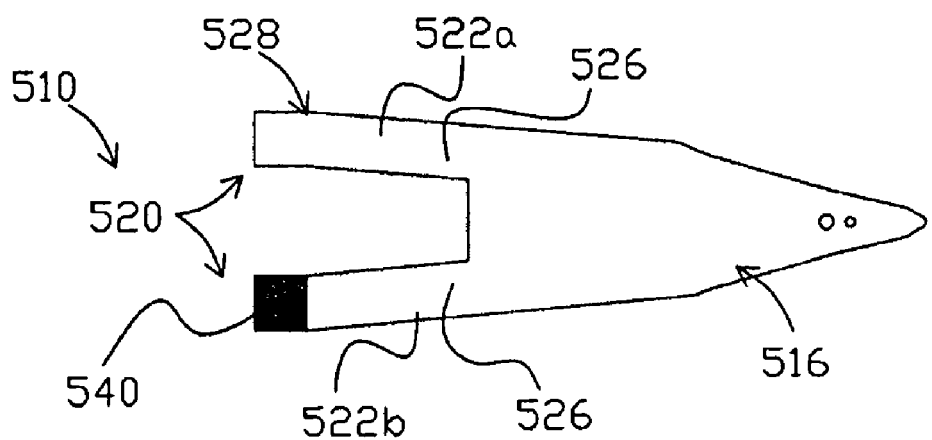
FIG. 7A is a schematic side view of a portion of a suspension in accordance with another embodiment of the invention.
Figure 7B:
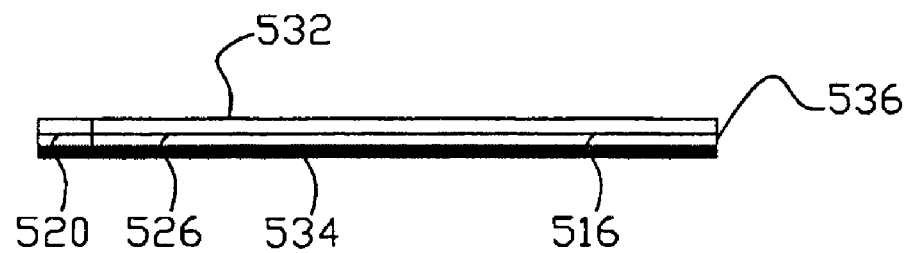
FIG. 7B is a schematic top view of the suspension of FIG. 7A.

FIGS. 7A and 7B are schematic top and side views, respectively, of a portion of a suspension 510 in accordance with another embodiment of the invention. Like the embodiment described above in connection with FIGS. 6A and 6B, the load beam 516 is manufactured from a multi-layer laminate and includes a spring region 528 and a beam region 526. Again, the hinge 512 is integrally formed with the load beam 516. In this embodiment the beam region 526 and much of the spring region 528, with the exception of the actuator mounting region 520 on one of the spring legs 522b, is formed from all three layers of the laminate. At an offset recess 540 at the actuator mounting region 520 of one spring leg 522b, the spring leg 522b is formed from only the second spring metal layer 534. The actuator mounting region 520, including the offset recess 540, can be welded or otherwise attached to a base plate or other primary actuator mounting structure (not shown).

Although the spring legs 522a, 522b of the spring region 528 are co-planar in this embodiment of the invention, the offset provided by the offset recess 540 will cause motion of the beam region 526 with respect to the actuator mounting region 520 to include a TMR-compensating radial component. Yet another embodiment of the invention is similar to that shown in FIGS. 7A and 7B, but does not include the gap or cutout in the spring region 528 forming the spring legs 522a, 422b (i.e., the spring region 528 is one-piece). In alternative embodiments (not shown), the load beam region 526 includes only one of the spring metal layers 532, 534, and optionally the etch stop layer 536.

Figure 8C:
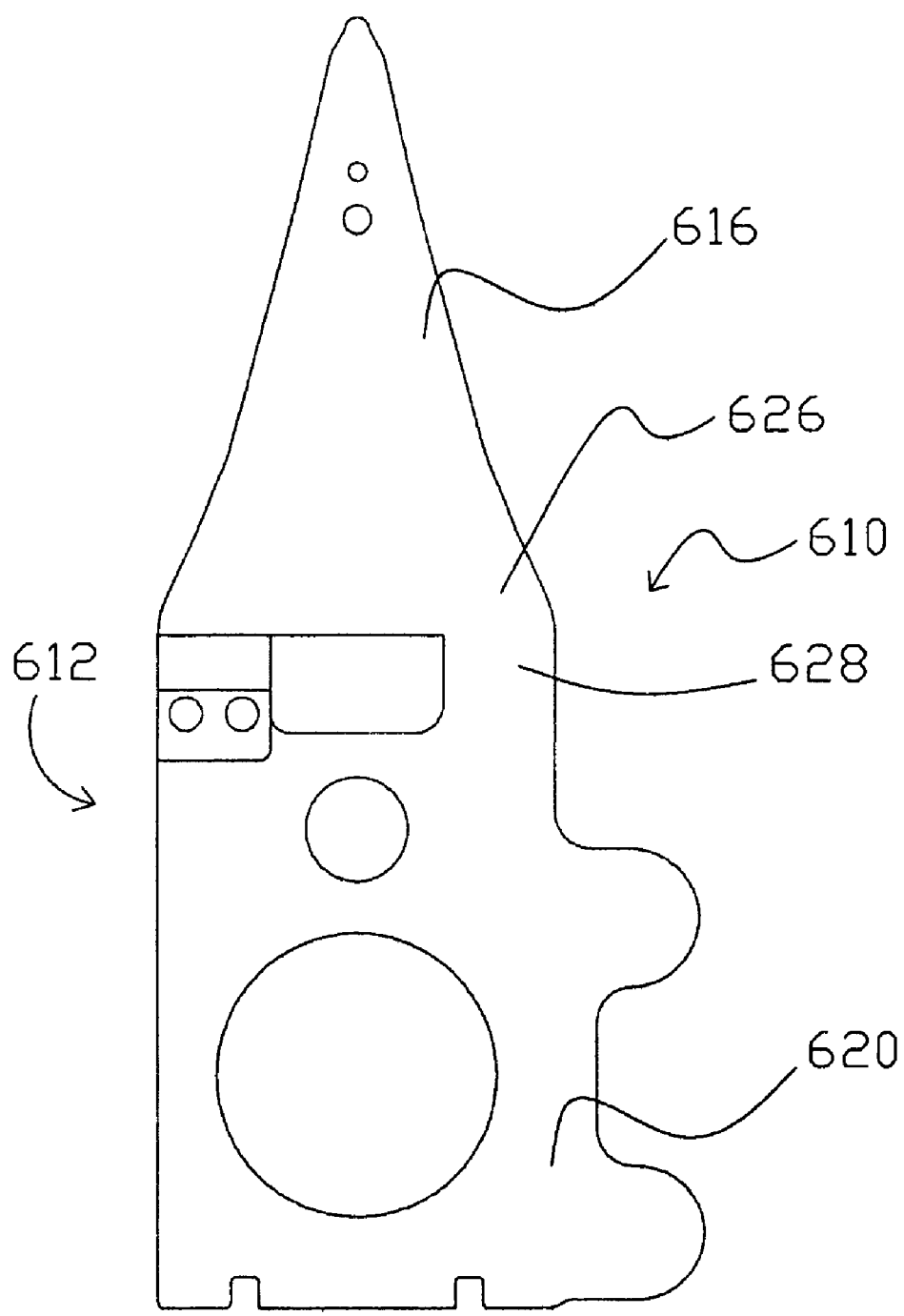
FIG. 8C is a schematic top view of the assembled portion of the suspension of FIGS. 8A and 8B.

FIGS. 8A and 8B are schematic top views of the second and first spring metal layers 634, 632, respectively, of a portion of the suspension 610 with the etch stop layer 636 omitted for clarity. FIG. 8C shows the suspension 610 of FIGS. 8A and 8B assembled. Again, the hinge 612 is integrally formed with the load beam 616. In this embodiment, the beam region 626 is formed in both the first spring metal layer 632 and the second spring metal layer 634 while the actuator mounting region 620 is formed only in the second spring metal layer 634. One of the spring legs 622b is formed in the second spring metal layer 634 and is integrally formed with second spring metal layers of both the beam region 626 and the actuator mounting region 620. The other spring leg 622a is formed in the first spring metal layer 632 and is integrally formed with the first spring metal layer of the beam region 626. As shown in FIG. 8A, a gap 641 is provided in the second spring metal layer 634 at the spring region 628 of the first spring leg 622a such that each of the spring legs 622a, 622b is formed in only one layer of spring metal. The first spring leg 622a extends over the gap 641 and is fastened to the baseplate 614 at the actuator mounting region 620 via the second spring metal layer 634.

Figure 9B:
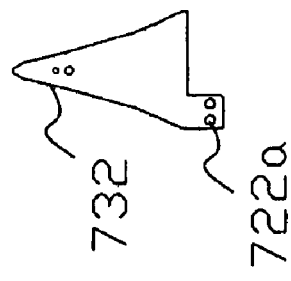
FIG. 9B is a schematic top view of the first spring metal layer of the portion of the suspension of FIG. 9A.
Figure 9A:
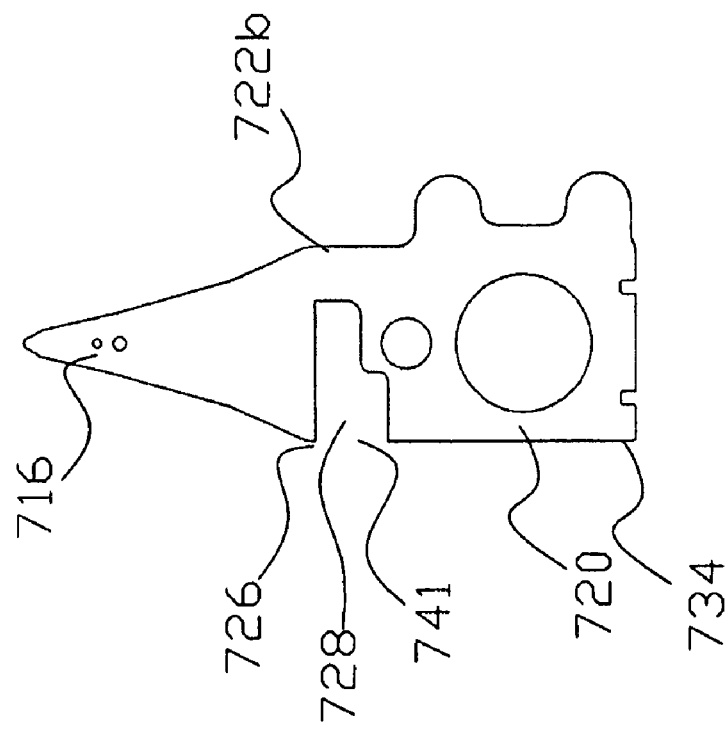
FIG. 9A is a schematic top view of the second spring metal layer of a portion of a suspension in accordance with another embodiment of the invention.
Figure 9C:
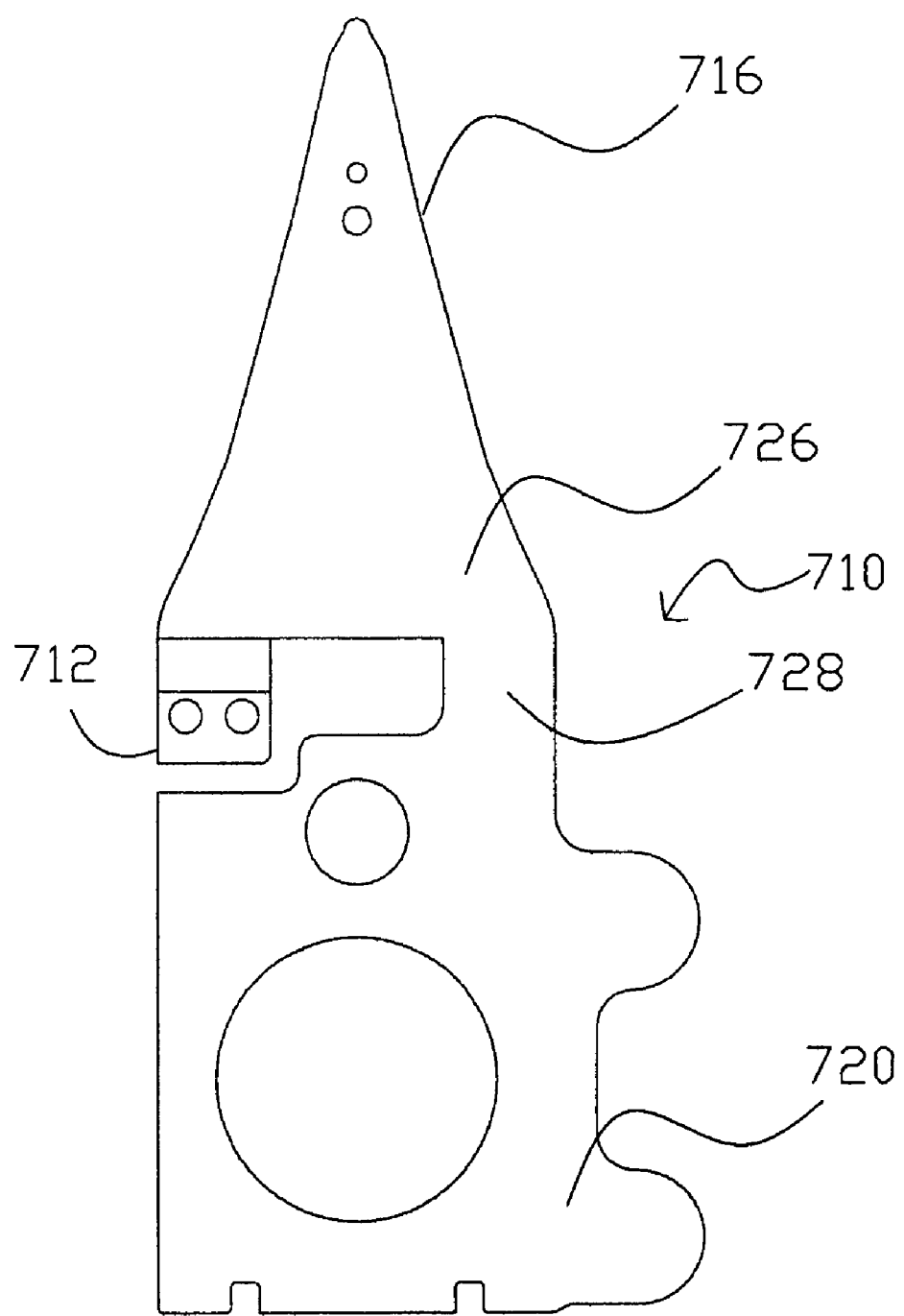
FIG. 9C is a schematic top view of the assembled portion of the suspension of FIGS. 9A and 9B.

FIGS. 9A and 9B are schematic top views of the second and first spring metal layers 734, 732, respectively, of a portion of the suspension 710 with the etch stop layer 736 omitted for clarity. FIG. 9C shows the suspension 710 of FIGS. 9A and 9B assembled. With the exception of the actuator mounting region 720, the load beam 716 shown in FIGS. 9A and 9B can be similar or identical to the load beam 716 described in connection with FIGS. 8A and 8B. In the embodiment shown in FIGS. 9A and 9B, the length of the gap 741 is greater than the length of the first spring leg 722a. Thus, the first spring leg 722a is attached directly to the baseplate (not shown). In contrast, FIGS. 8A-8C show a region of the second spring metal layer 734 is interposed between the first spring leg 722a and the baseplate (not shown).

In general, there are two configurations by which the TMR-compensating offset is performed. The choice is dictated by the desired geometry of the hinge or spring region and load beam. If the hinge or spring region surface is desired to have both spring legs at the same Z-height, the offset material, much like a shim, is formed only under the spring region at the actuator mounting region or beam region. Similarly, an offset recess may be employed. The load beam is in turn twisted about the length of the part by the desired amount so that the beam region is twisted or skewed with respect to the actuator mounting region. This configuration generally corresponds to the embodiments illustrated in FIGS. 6A-7B. A variation of this configuration is shown in FIGS. 3A-3C, where the hinge 112 is a separate component. While the hinge body is uniformly offset from the load beam, the spring legs 122a and 122b are formed in the same layer of the laminate with the offset island 138 acting as a shim under the beam region 126 of the first spring leg 122a.

The other configuration would have the hinge radius spring legs at different Z-heights and the load beam being on the same plane as the body of the hinge. Then, the radius spring legs would account for the desired twist effect when the part is rolled, due to the uneven nature of the hinge surfaces. This configuration generally corresponds to the embodiments illustrated in FIGS. 4A-5B and 8A-9C. A variation of this configuration is shown in FIGS. 1-2C, in which the hinge is a separate component. The hinge body is uniformly offset from the load beam, while the spring legs are at different Z-heights.

In addition to providing a TMR-compensating function, the invention offers a number of important advantages. It allows the use of existing or conventional multi-piece suspension assembly technology. It reduces the need for additional components to be added to the suspension by integrating the desired feature into an existing part of the suspension. The material that is used to create the offset, whether it is an offset island or non-coplanar spring legs, has relatively low mass, an important feature given the increasingly critical nature of mass balance and reduction with the evolution of suspension technologies.

From an assembly standpoint, the invention lends itself to being able to be processed in the same way as other known suspensions. The actual attachment of the components through welding is not further complicated through the addition of extra components and the proposed design can be processed with proven technologies by welding, forming, de-tabbing, photoetching, general processing and line processing. This type of design concept also allows the offset to be contained entirely within the suspension itself and requires no special operations to be performed to the suspension externally to get the desired offset. The amount of offset can be varied through the selection of the laminate that is used. For example, the magnitude and sensitivity of the TMR-compensating radial displacement can be controlled by the height of the offset (e.g., by the distance between the first and second spring metal layers).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A hinge component for use with a load beam and manufactured from a laminate including first and second spring metal layers separated by an etch stop layer, the hinge component having a spring region including a TMR-compensating offset structure and non-coplanar spring legs, comprising:
    a first spring leg formed from only the first spring metal layer and optionally the etch stop layer, and
    a second spring leg formed from the first spring metal layer, the second spring metal layer and the etch stop layer, the first spring leg having a gap in the first spring metal layer.

2. A hinge component for use with a load beam and manufactured from a laminate including first and second spring metal layers separated by an etch stop layer, the hinge component having a spring region including a TMR-compensating offset structure and non-coplanar spring legs, comprising:
    a first spring leg formed from only the first spring metal layer and optionally the etch stop layer, and
    a second spring leg formed from only the second spring metal layer and optionally the etch stop layer.

* * * * *

UNITED STATES PATENT AND TRADEMARK OFFICE
CERTIFICATE OF CORRECTION

PATENT NO. : 7,606,000 B1  Page 1 of 1
APPLICATION NO. : 11/370572
DATED : October 20, 2009
INVENTOR(S) : Brandts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Fifth Day of October, 2010

David J. Kappos
*Director of the United States Patent and Trademark Office*